Patented July 18, 1939

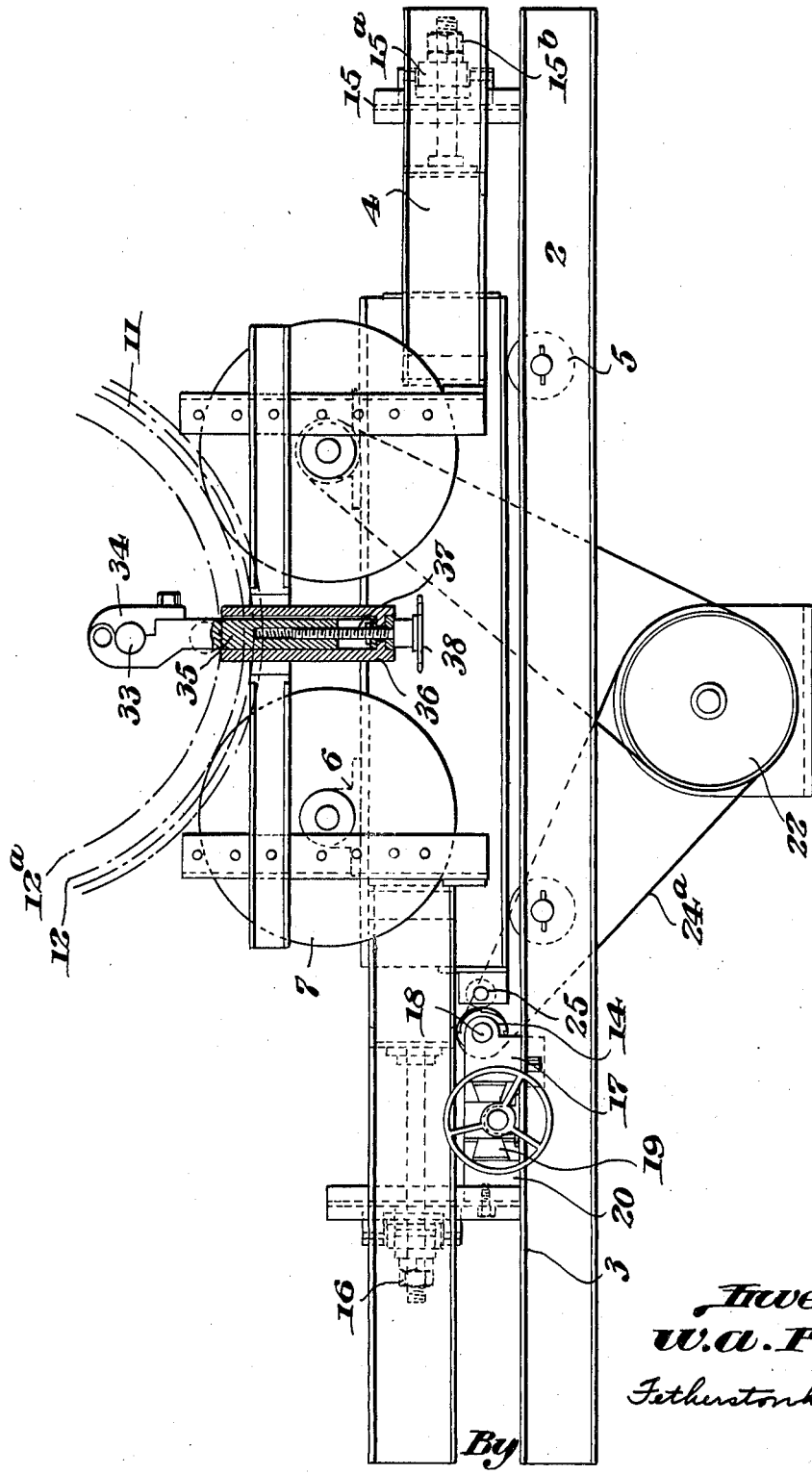

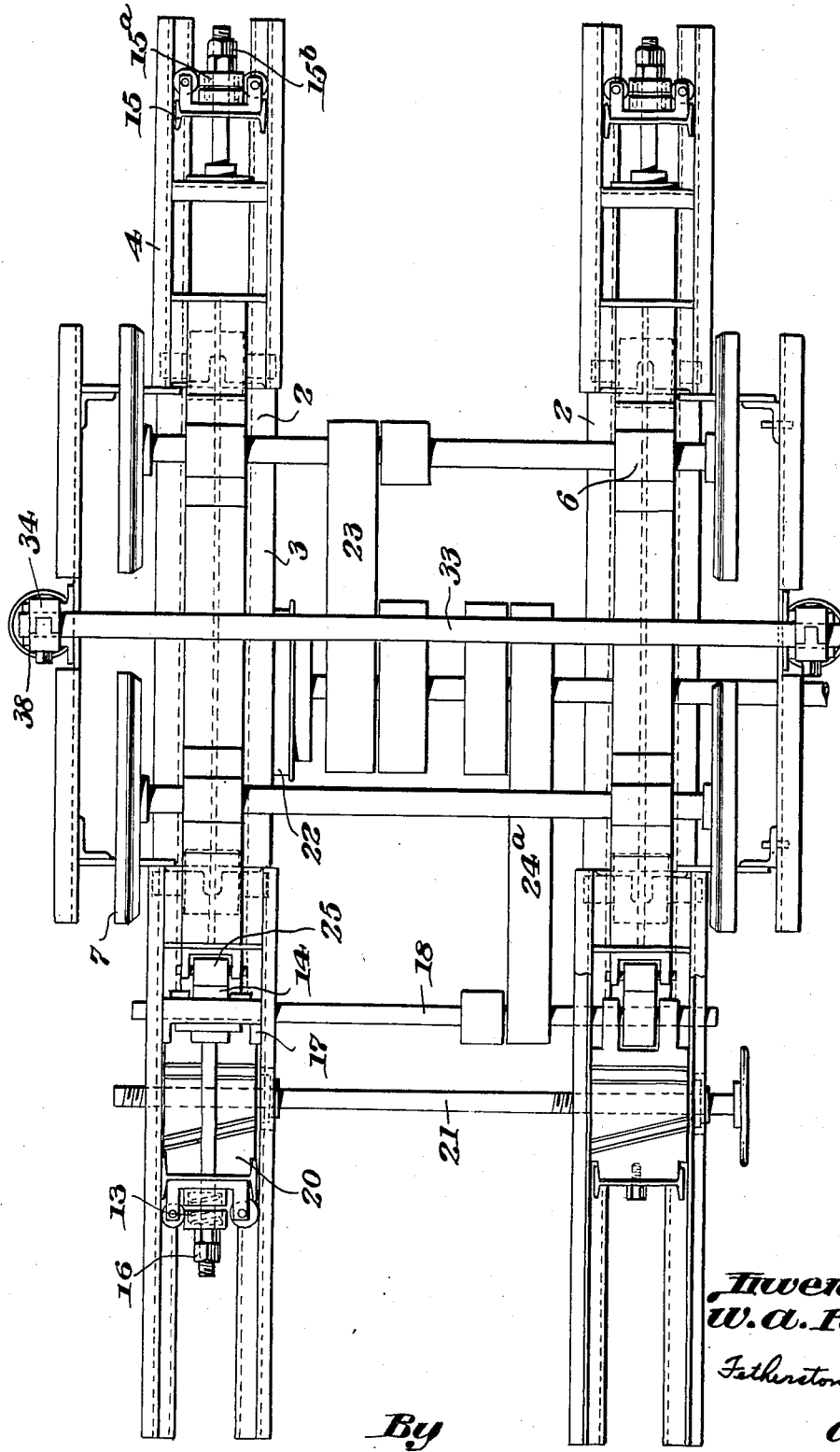

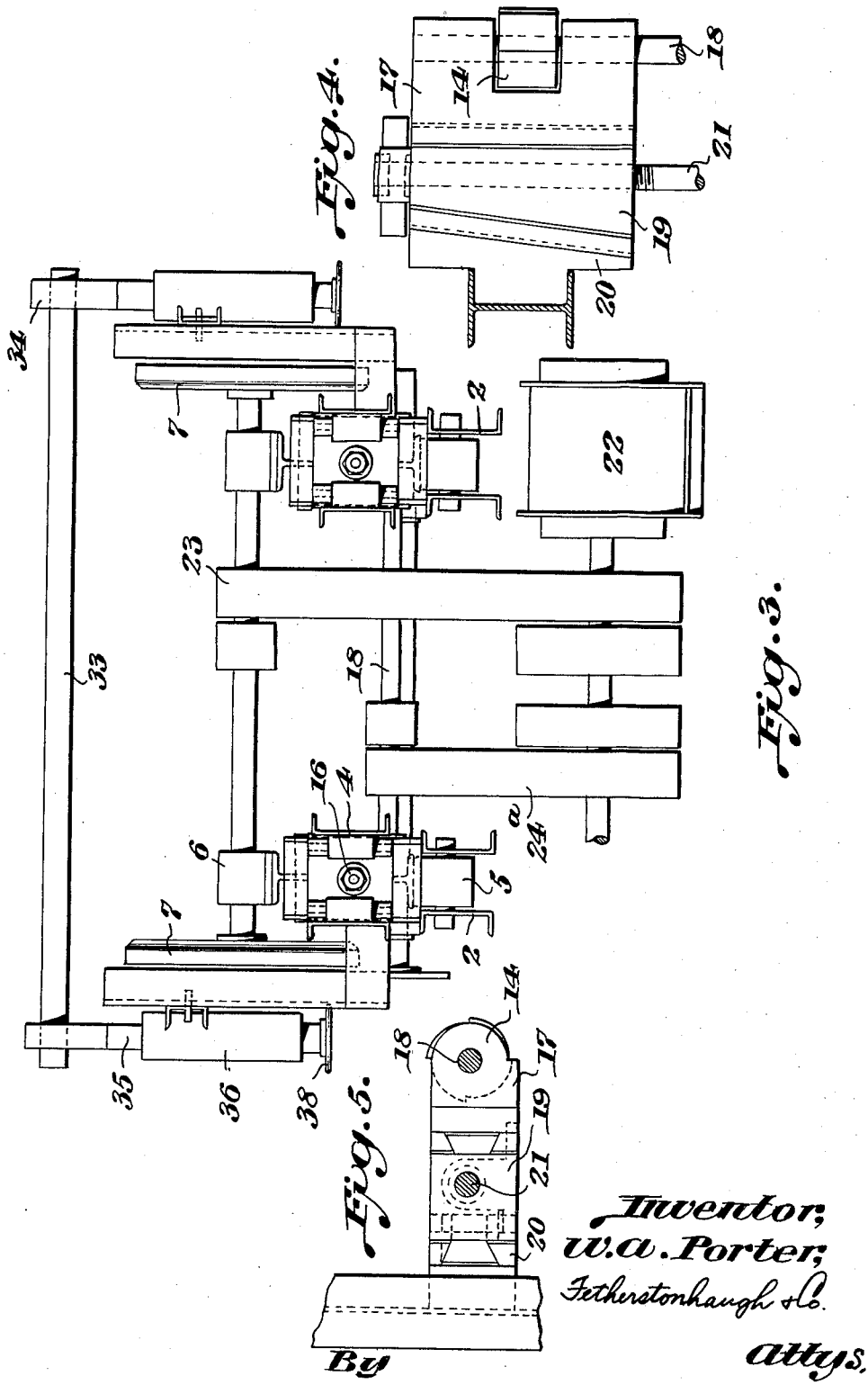

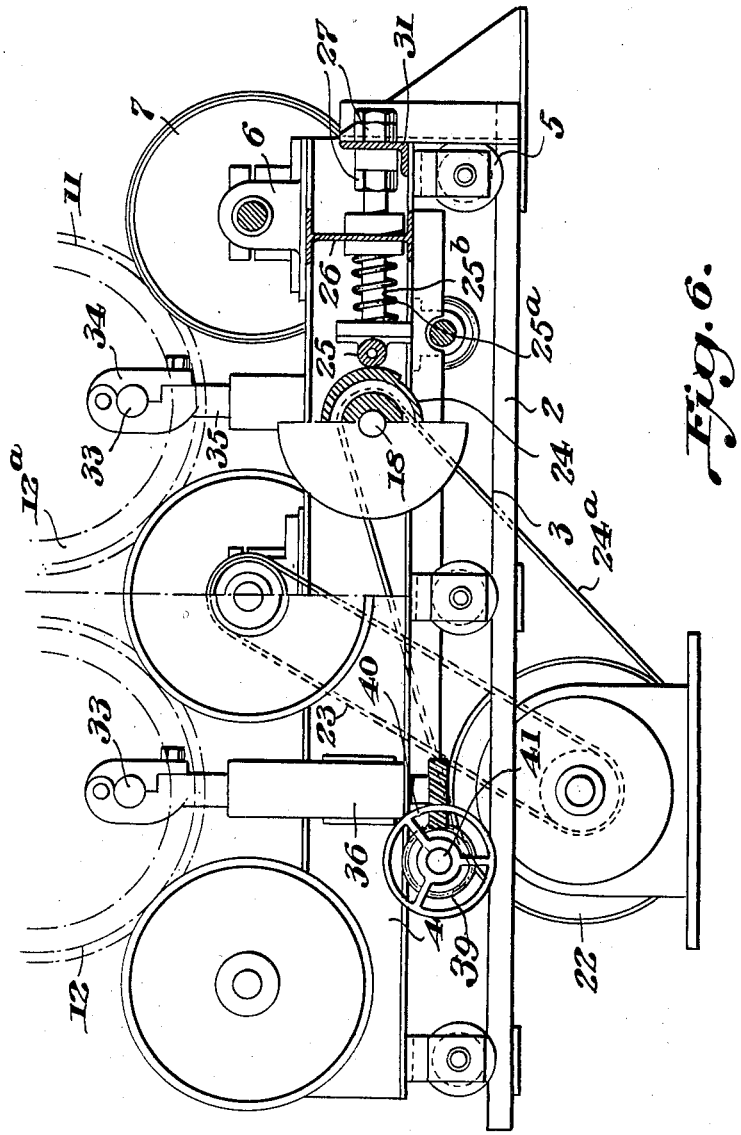

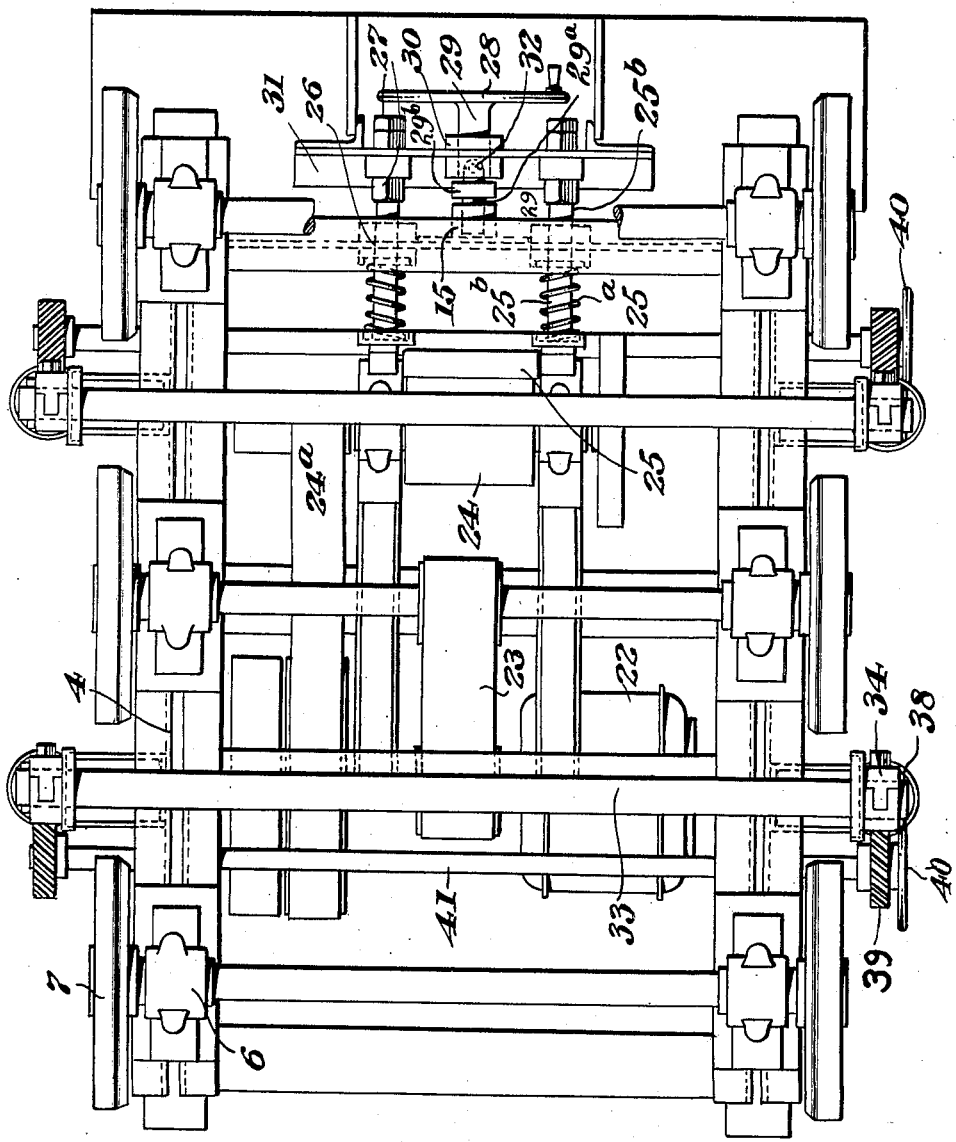

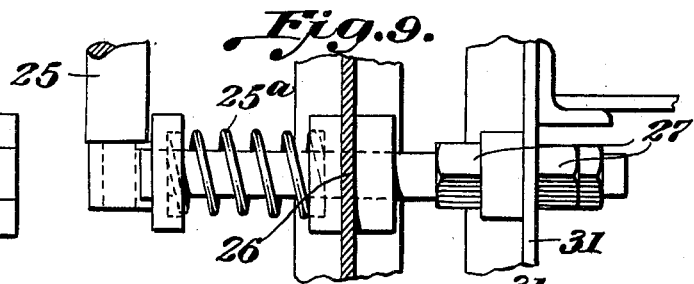
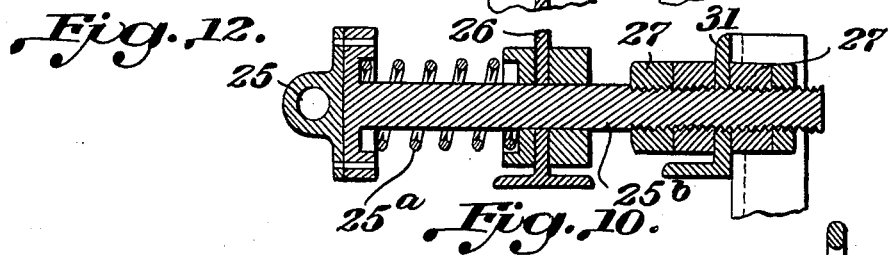
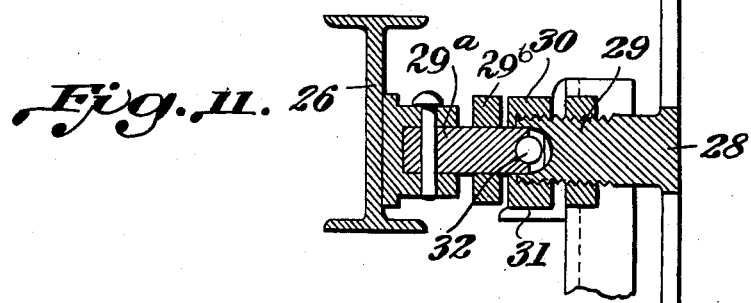
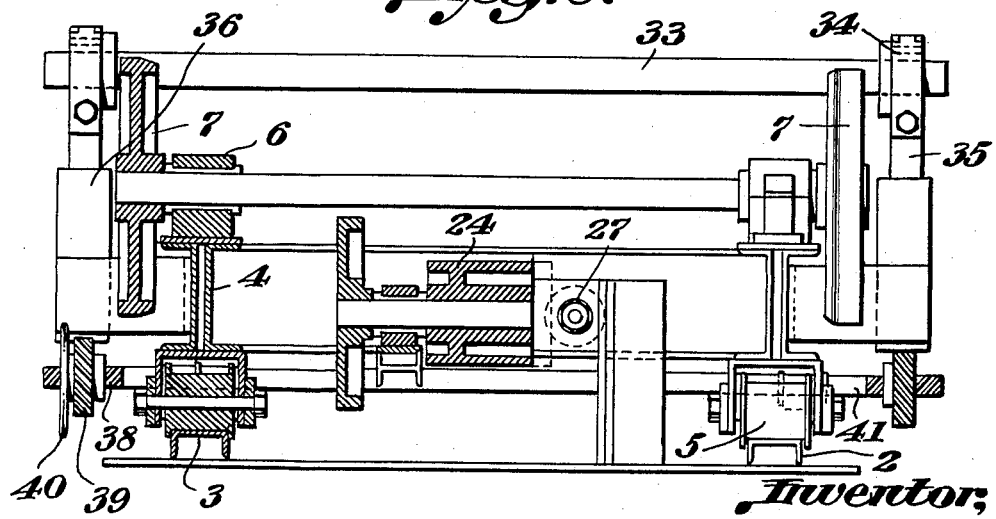

2,166,175

UNITED STATES PATENT OFFICE 2,166,175

CONSTRUCTION OF PIPES AND THE LIKE OF CONCRETE OR OTHER CEMENTITIOUS MATERIAL

William Alfred Porter, Red Hill, Brisbane, Queensland, Australia

Application July 16, 1937, Serial No. 154,082
In Australia July 16, 1936

11 Claims. (Cl. 25—30)

This invention relates to the manufacture of pipes, conduits, and other like hollow objects of cement or other concrete or other cementitious material, the object being to provide improved methods of and means by which such pipes or the like may be manufactured expeditiously, the material of which they are made being thoroughly consolidated so that the pipes or the like are strong and free of interstices or blow holes. The articles will be such that they will stand a heavy and uniform strain.

The method consists in quickly placing and spreading the required quantity of cementitious material of semi-liquid or non-liquid consistency in a mould while the mould is rotating. After sufficient cementitious material has been placed it is compressed as required by a roller to an even surface. The roller is then removed, and, as the speed of rotation is increased, thus increasing the centrifugal action, a transverse and/or longitudinal smart horizontal jolting or concussional action is imparted to the mould for a suitable length of time and then stopped, the rotary movement being continued for a further time. The compression may be continued during the period of high speed rotation and jolting of the mould.

The machine by which the pipes or the like are made comprises a solid foundation having tracks on which in turn is supported a carriage capable of being jolted horizontally back and forth. On the carriage are a number of pairs of wheels or rollers, one or more, driven from a source of power supply. These wheels or rollers frictionally carry and rotate moulds in which the pipes are moulded. The cementitious material is screeded to thickness after being placed in the mould.

A roller carried by bearings adjustably supported on the foundation or carriage is provided for compressing the cementitious material in the mould. The adjustment of the bearings, and consequently the roller, regulates the degree of compression, and the compression may take place before or during the period of high speed rotation and jolting or concussional action. Furthermore, the compression may be varied as desired during the operation of forming the pipe or conduit. The roller is rotated by frictional contact with the rotating material or by mechanical drive.

In order that the invention may be better understood it will now be more fully described with the aid of the accompanying drawings, in which:

Fig. 1 is a side elevation
Fig. 2 is a plan
Fig. 3 is an end elevation
Figs. 4 and 5 are views of details.
Fig. 6 is a side elevation of an alternative arrangement
Fig. 7 is a plan, part in section
Fig. 8 is an end elevation, part in section
Figs. 9–12 are views of details.

The foundation 2 is of solid formation, of channel, H, or other sectional girders tied, braced, and bolted and/or otherwise secured together and providing two or more tracks 3 above which a carriage 4 may be moved back and forth longitudinally, hardened bearing plates and roller, ball, or other bearings 5 being provided to reduce friction.

On the carriage 4 are bearings 6 axially carrying a number of wheels or rollers 7 driven from a source of power supply by belting, sprocket wheels and chains, or other mode of drive. It is necessary to provide means, such as what is known as "Reeves" drive or other means by which the speed of rotation of the rollers may be increased or decreased as required. The variable speed control mechanism is operated as found most convenient.

The wheels or rollers 7 support one or more moulds 11, frictional contact being made with circular tracks 12 thereon so as to cause them to rotate. The wheels or rollers 7 are arranged so that the moulds 11 may be placed longitudinally or transversely of the carriage 4.

The mould 11 would be of suitable transverse section, such as round, square, hexagonal, or as desired, on its external surface. End annular flanges 12a are fitted to keep the cementitious material in the mould and be a guide to the thickness of the wall of the pipe or conduit.

Referring more particularly to Figs. 1 to 5, jolting or concussional action is imparted to the moulds 11 on a horizontal plane, whether placed transversely or longitudinally, and for this purpose tension or compression springs 13 are provided for moving the carriage 4 in one direction while a cam 14, with a sudden stepdown is provided to intermittently push the carriage 4 forward and sharply release or force the carriage back against a stop block or blocks 15, suitably placed and secured on the foundation.

The jolting or concussional action may be varied in intensity by adjusting the position of buffers 15a in relation to the stop blocks 15, by adjusting the nuts 15b, by adjusting the tension or compression of the springs 13, as by the nuts 16, or by varying the position of the bearings 17 in which rotates the shaft 18 carrying the cams 14. For this purpose wedges 19 between the brackets 20 on the foundation 2 and bearings 17 are moved as required by the screwed rods 21. The wedges 19 may be opposed if desired. The arrangement of foundation, carriage, and mould supporting rollers as shown in Figs. 6 to 8 is somewhat the same as shown in Figs. 1 and 2, the motive power being as in the case of the arrangement shown in Figs. 1 and 2 an electric motor 22, which may be constructed or controlled so that variable speed may be imparted, suitable belt drive 23 being provided.

In the arrangement show in Figs. 6 to 11 a single cam 24 is used and the arrangement of drive 24a is such that power may be cut off when desired. The cam 24 operates against the roller 25, backed by the spring buffers 25a, interposed between it and the cross member 26 of the carrier 4. The tension of the spring buffers 25a which are carried on the rods 25b is regulated by the adjusting nuts 27. The degree of concussion is regulated by the hand wheel 28. As shown clearly in Figures 7 and 11, the cross member 26 of the carriage is fitted with an abutment stud 29a, having a ball head 32, and which receives the recessed end of an impact shaft 29 which is threaded through the cross head 31 and is fitted with said handwheel 28. A buffer collar 29b is threaded on the stud 29a, and seats upon an impact boss 30 threaded on shaft 29. Operation of handwheel 28 actuates bars 30 toward buffer 29b Alternatively, the collar 29b can be turned by hand on stud 29a to move it towards or away from boss 30. As previously mentioned, the main shaft is driven from any source of power supply by belting or otherwise. The subsidiary shaft 18 from which motion for jolting or concussion is obtained, is driven therefrom by belting, spur wheels, or sprocket wheels and chains. Means are provided for controlling the rotation of the shafts independently of one another and so that the speed of rotation may be varied as desired.

A roller 33 carried by bearings 34 adjustably supported on the foundation 2, or, preferably carriage 4 is provided for screeding and compressing the cementitious material in the mould. The bearings 34 are such that the roller 33 may be put in place or removed when desired. The adjustment of the position of the bearings 34 and consequently the roller 33, regulates the degree of compression, and the compression may take place before, during, or after the period of high speed rotation and/or jolting or concussional action. Furthermore, the compression may be varied as desired during the operation of forming the pipe or conduit. For this purpose to raise or lower the bearings 34 they are carried on the internally screwed stem 35 carried in the boss 36 secured on the carriage 4 (or foundation 2). This boss 36 (see Fig. 1) carries the screw 37 prevented from moving endwise and screwed into the stem 35. This screw 37 may be operated by the hand wheel 38 or by cog wheels 39 (Figs. 6 to 8) or bevel wheels in turn operated by a hand wheel 40 on the shaft 41. The bearings 34 may be operated singly or at the one time in which case the cog or bevel wheels and hand wheel would be suitably arranged and operated.

The constructional details may be varied as desired according to the size of the machine and the number and size of the pipes to be manufactured.

The operation of the machine is as follows:

The mould, after being commenced to rotate, has a sufficient quantity of cementitious material thrown into it from each end until approximately the desired distance above the level of the inner diameter of the annular flange 12a. The rotation at this speed is continued for a time and then, as it is gradually increased, smart jolting or concussional action is imparted to the mould for a sufficient time. The jolting or concussional action is then stopped but the rotation of the mould at a high speed is continued for a further period.

The over filled material is, in the early stage of the rotation of the mould, screeded to an even surface by the roller which for the desired period of time, is held stationary at the requisite distance from the annular flange. It is then released and allowed to rotate while being adjusted so as to gradually increase the compression of the cementitious material to the desired degree of compression. As previously mentioned, this compression may take place before, during or after the rotation and/or concussion of the mould.

Having now fully described and ascertained the said invention and the manner in which it is to be performed, I declare that what I claim is:

1. A process for the manufacture of pipes and like formations from cementitious material under centrifugal action, according to which the material is fed into a mould rotating about its axis, the mould is continuously displaced by reciprocations in the horizontal plane and transversely of the mould axis, each reciprocation is suddenly terminated to jolt the mould, and the material in the mould is simultaneously subjected to a positive radial compacting pressure applied to its interior surface.

2. A machine for the manufacture of pipes and like formations from cementitious material, comprising a carriage mounted on a foundation for displacement by reciprocations in the horizontal plane, a mould rotatably mounted transversely on said carriage, means for causing continuous reciprocation displacements of said carriage in the horizontal plane and for suddenly terminating each such reciprocation, a removable compacting roller extending through said mould and mounted on said carriage, and means for applying through said roller a positive radial pressure on the material in the mould.

3. A machine according to claim 2, in which the roller is mounted in a bearing at each end of the mould, and said bearings are fitted with screw means for vertical adjustment, and including means for adjusting said bearings in unison at each end of the mould to evenly apply said positive radial pressure on the material.

4. A machine for the manufacture of pipes and like formations from cementitious material, comprising a carriage mounted on a foundation for displacement by reciprocations in the horizontal plane, a mould rotatably mounted transversely on said carriage, a rotatable cam adapted to displace the carriage in one direction, a return spring operating on the carriage to displace it in the return direction, and a stop for suddenly terminating the return displacement of the carriage.

5. A machine according to claim 4, in which the stop comprises a buffer mounted on the carriage and a co-operating impact block mounted on the foundation.

6. A machine according to claim 4, in which the cam is mounted on the foundation and including means for adjusting the cam on the foundation in relation to the carriage.

7. A machine according to claim 4, and including means for adjusting the pressure of the return spring.

8. A machine according to claim 4, in which the stop comprises a buffer mounted on the carriage and a co-operating impact block mounted on the foundation, and means for mutually adjusting said buffer and impact block to regulate the mean position of the carriage.

9. A machine according to claim 4, in which the cam is mounted on the carriage, the return spring bears upon the carriage and urges the cam into contact with a member fixed to the foundation, and the stop is constituted by an impact block fixed to the foundation and a co-operating buffer mounted on the carriage.

10. A machine according to claim 4, in which the cam is mounted on the carriage substantially centrally thereof, the return spring is adjustable and bears upon a cross-member of the carriage and urges the cam into contact with a member fixed to the foundation, and the stop is constituted by an impact block fixed to the foundation and a co-operating buffer mounted on the cross-member of the carriage, and including means for mutually adjusting said impact block and buffer to regulate the mean position of the carriage.

11. A machine according to claim 4, and including a removable compacting roller extending through said mould and mounted on the carriage in a vertically adjustable bearing at each end of the mould, and including means for adjusting said bearings in unison to apply a positive radial pressure on material in the mould.

WILLIAM ALFRED PORTER.